United States Patent
Kim et al.

(10) Patent No.: US 10,030,180 B2
(45) Date of Patent: Jul. 24, 2018

(54) ADHESIVE FILM, ADHESIVE COMPOSITION FOR THE SAME, AND DISPLAY MEMBER INCLUDING THE SAME

(71) Applicant: CHEIL INDUSTRIES INC., Gumi-si, Gyeongsangbuk-do (KR)

(72) Inventors: Jee Hee Kim, Uiwang-si (KR); Ki Yong Kim, Uiwang-si (KR); Lee June Kim, Uiwang-si (KR); Chan Woo Kim, Uiwang-si (KR); Sung Hyun Mun, Uiwang-si (KR); Ik Hwan Cho, Uiwang-si (KR); In Cheon Han, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 297 days.

(21) Appl. No.: 14/141,379

(22) Filed: Dec. 26, 2013

(65) Prior Publication Data
US 2014/0186603 A1 Jul. 3, 2014

(30) Foreign Application Priority Data
Dec. 27, 2012 (KR) .......................... 10-2012-0155615

(51) Int. Cl.
*C09J 139/04* (2006.01)
*C09J 7/00* (2018.01)
(Continued)

(52) U.S. Cl.
CPC .............. *C09J 139/04* (2013.01); *C09J 7/00* (2013.01); *C09J 7/10* (2018.01); *C09J 7/385* (2018.01);
(Continued)

(58) Field of Classification Search
CPC . C09J 133/10; C09J 139/04; C09J 7/00; C09J 7/0217; C09J 2201/622;
(Continued)

(56) References Cited

U.S. PATENT DOCUMENTS 5,141,989 A 8/1992 Jung et al.
5,889,118 A 3/1999 Delgado et al.
(Continued)

FOREIGN PATENT DOCUMENTS

CN 1355834 A 6/2002
CN 101679822 A 3/2010
(Continued)

OTHER PUBLICATIONS

English translation of JP1996-120249A retreived from JPIatPat Mar. 30, 2017.*
(Continued)

*Primary Examiner* — Alicia Chevalier
*Assistant Examiner* — Laura B Figg
(74) *Attorney, Agent, or Firm* — Lewis Roca Rothgerber Christie LLP

(57) ABSTRACT

An adhesive film, an adhesive composition for the same, and a display member including the same are disclosed. The adhesive film includes a cured product of an adhesive composition, which includes a (meth)acrylic copolymer formed from a monomer mixture including (a1) an alkyl (meth)acrylate having a $C_1$ to $C_{17}$ alkyl group and (a2) an alkyl (meth)acrylate having an alkyl group having 18 or more carbon atoms. The adhesive film has a ratio (B/A) of 90° peel strength (B) after aging the adhesive film at 25° C. for 30 minutes and leaving the adhesive film at 90° C. for 40 seconds to 90° peel strength (A) after aging the adhesive film at 25° C. for 30 minutes of about 0.1 or less.

15 Claims, 1 Drawing Sheet

(51) Int. Cl.
*C09J 133/10* (2006.01)
*C09J 7/38* (2018.01)
*C09J 7/10* (2018.01)

(52) U.S. Cl.
CPC ......... *C09J 133/10* (2013.01); *C08L 2312/00* (2013.01); *C09J 2201/622* (2013.01); *C09J 2203/318* (2013.01); *G02F 2202/28* (2013.01); *Y10T 428/2887* (2015.01)

(58) Field of Classification Search
CPC ............ C09J 2203/318; C08L 2312/00; G02F 2202/28; Y10T 428/2887
USPC ......................................................... 428/220
See application file for complete search history.

(56) References Cited

U.S. PATENT DOCUMENTS

| | | | | |
|---|---|---|---|---|
| 2004/0202879 | A1* | 10/2004 | Xia | B32B 7/12 428/500 |
| 2005/0014879 | A1* | 1/2005 | Moroishi | C09J 133/02 524/261 |
| 2007/0163705 | A1* | 7/2007 | Dollase | B05D 1/42 156/247 |
| 2008/0085417 | A1* | 4/2008 | Takeko | B32B 7/12 428/441 |
| 2010/0178499 | A1* | 7/2010 | Imai | C09J 133/14 428/355 AC |
| 2014/0065417 | A1* | 3/2014 | Higashi | C09J 133/066 428/355 AC |

FOREIGN PATENT DOCUMENTS

| | | | |
|---|---|---|---|
| CN | 102105551 A | 6/2011 | |
| CN | 103131356 A | 6/2013 | |
| JP | 1996120249 A * | 5/1996 | |
| JP | 2000355684 A * | 12/2000 | ............ C09J 7/0217 |
| KR | 10-2012-0060782 A | 6/2012 | |
| KR | 10-2012-0078589 A | 7/2012 | |
| TW | 201245369 A1 | 11/2012 | |

OTHER PUBLICATIONS

English translation of JP2000-355684A retrieved from JPlatPat Nov. 17, 2017 (Year: 2000).*
"Docosyl Acrylate" PubChem Open Chemistry Database of NIH Aug. 8, 2005 (Year: 2005).*
SIPO Office action dated Dec. 17, 2014, in corresponding application No. 201310741638.6, with English translation,19 pages.
KIPO Office action dated Feb. 13, 2015, issued in priority application No. KR 10-2012-0155615, 4 pages.
Taiwanese Patent Office action dated Dec. 9, 2014 in corresponding application No. 102148698, 6 pages.

* cited by examiner

ADHESIVE FILM, ADHESIVE COMPOSITION FOR THE SAME, AND DISPLAY MEMBER INCLUDING THE SAME

CROSS-REFERENCE TO RELATED APPLICATION

This application claims priority to and the benefit of Korean Patent Applications No. 10-2012-0155615, filed on Dec. 27, 2012 in the Korean Intellectual Property Office (KIPO), the entire content of which is incorporated herein by reference.

BACKGROUND

1. Field

Aspects according to embodiments of the present invention relate to an adhesive film, an adhesive composition for the same, and a display member including the same.

2. Description of the Related Art

Optical clear adhesive (OCA) films are adhesive films used for attaching layers of stacking components in an optical display device, or for attaching touchscreens to mobile phones. For example, a capacitive touchpad can be attached to a window or film via an adhesive film, and the capacitive touchpad can still sense (or detect) variations in capacitance of the window or film. In the capacitive touchpad, the adhesive film can be stacked between a window glass and a touch screen panel (TSP) sensor glass.

OCA films have advantages of improving visibility of a screen and providing good adhesion as compared with existing double-sided tapes, while also providing a glass-like function (e.g., transparency) by transmitting 97% or more of the light. OCA films may be used in Tablet personal computers (PCs), televisions (TVs), and the like, which have display screens of medium or large size, in addition to mobile phones.

Here, depending upon the composition of the components of the display device, for example, the kind or composition of a transparency or window (e.g., glass, polymethylmethacrylate (PMMA), polycarbonate (PC), and the like) a touchpad may exhibit various defects or problems, such as detachment, bubbling, warpage, ITO pattern exposure, and the like, upon a change in environmental conditions. In the touchpad, various acids present in transparent adhesives can oxidize the adhesive film, thereby possibly deteriorating the properties of the touchpad through an increase in resistance. Thus, it is advantageous for the touchpad to minimize (or reduce) changes in resistance of the adhesive film.

Further, existing adhesives must be totally discarded when a failure occurs during or after an attachment process. When a failure does not occur, existing adhesives can be reused through a reworking process using a specific wire, but the touch panel must be discarded.

SUMMARY

One aspect of an embodiment of the present invention relates to an adhesive film, which includes a cured product of an adhesive composition including a (meth)acrylic copolymer formed from a monomer mixture including (a1) an alkyl (meth)acrylate having a $C_1$ to $C_{17}$ alkyl group, and (a2) an alkyl (meth)acrylate having an alkyl group having 18 or more carbon atoms. The adhesive film has a ratio (B/A) of about 0.1 or less. In the ratio (B/A), B is the 90° peel strength obtained after aging the adhesive film at 25° C. for 30 minutes and leaving the adhesive film at 90° C. for 40 seconds, and A is the 90° peel strength obtained after aging the adhesive film at 25° C. for 30 minutes.

The 90° peel strength (A) may be about 1800 g/in to about 3500 g/in, and the 90° peel strength (B) may be about 50 g/in to about 350 g/in.

The (a2) alkyl (meth)acrylate having an alkyl group having 18 or more carbon atoms may include a (meth)acrylate having a $C_{21}$ to $C_{25}$ alkyl group.

The (a1) alkyl (meth)acrylate having a $C_1$ to $C_{17}$ alkyl group may be ethylhexyl (meth)acrylate, and the (a2) alkyl (meth)acrylate having an alkyl group having 18 or more carbon atoms may be behenyl (meth)acrylate.

The (a2) alkyl (meth)acrylate having an alkyl group having 18 or more carbon atoms may be present in the monomer mixture in an amount of about 5% by weight (wt %) to about 15 wt %, based on the total amount of the monomer mixture.

The monomer mixture may further include (a3) a (meth)acrylate having an alicyclic group, (a4) a (meth)acrylate having a hydroxyl group, and (a5) a (meth)acrylate having a hetero-alicyclic group.

The adhesive composition may further include at least one selected from an initiator and a cross-linking agent.

The adhesive composition may further include a silane coupling agent.

The adhesive film may have a rate of change of resistance (ΔR) of about 2.0% or less (about 0% to about 2%), as represented by Equation 1:

$$\Delta R = \frac{P_2 - P_1}{P_1} \times 100, \quad \text{Equation 1}$$

In Equation 1, $P_2$ is a resistance of the adhesive film after exposing the adhesive film to a temperature of 60° C. at a relative humidity of 90% (RH) for 240 hours, and $P_1$ is an initial resistance of the adhesive film.

The adhesive film may have a thickness of about 10 μm to about 2 mm.

Another aspect of an embodiment of the present invention relates to an adhesive composition, which includes: (A) a (meth)acrylic copolymer formed from a monomer mixture including at least one selected from (a1) an alkyl (meth)acrylate having a $C_1$ to $C_{17}$ alkyl group, (a2) an alkyl (meth)acrylate having an alkyl group having 18 or more carbon atoms, (a3) a (meth)acrylate having an alicyclic group, (a4) a (meth)acrylate having a hydroxyl group, and (a5) a (meth)acrylate having a hetero-alicyclic group; (B) an initiator; and (C) a cross-linking agent.

The (a2) alkyl (meth)acrylate having an alkyl group having 18 or more carbon atoms may be present in the monomer mixture in an amount of about 5 wt % to about 15 wt %, based on the total weight of the monomer mixture.

The (a2) alkyl (meth)acrylate having an alkyl group having 18 or more carbon atoms may include a (meth)acrylate having a $C_{21}$ to $C_{25}$ alkyl group.

The (meth)acrylic copolymer may include: about 50 wt % to about 55 wt % of the (a1) alkyl (meth)acrylate having a $C_1$ to $C_{17}$ alkyl group, based on the total weight of the (meth)acrylate copolymer; about 5 wt % to about 15 wt % of the (a2) alkyl (meth)acrylate having an alkyl group having 18 or more carbon atoms, based on the total weight of the (meth)acrylate copolymer; about 16 wt % to about 18 wt % of the (a3) (meth)acrylate having an alicyclic group, based on the total weight of the (meth)acrylate copolymer; about 15 wt % to about 18 wt % of the (a4) (meth)acrylate having a hydroxyl group, based on the total weight of the (meth)acrylate copolymer; and about 1 wt % to about 5 wt % of the (a5) (meth)acrylate having a hetero-alicyclic group, based on the total weight of the (meth)acrylate copolymer.

The adhesive composition may include 100 parts by weight of the (A) (meth)acrylic copolymer, about 0.001 parts by weight to about 3 parts by weight of the (B) initiator, and about 0.01 parts by weight to about 5 parts by weight of the (C) cross-linking agent.

The adhesive composition may further include an epoxy silane coupling agent.

A further aspect of an embodiment of the present invention relates to a display member, which includes: an optical film; and the adhesive film formed on one or more sides of the optical film.

The optical film may include touch panels, windows, polarizers, color filters, retardation films, elliptic polarizing films, reflective films, antireflective films, compensation films, brightness enhancing films, alignment layers, light diffusion films, anti-scattering films for glass, surface protective films, plastic liquid crystal display (LCD) substrates, indium tin oxide (ITO) films, fluorinated tin oxide (FTO) films, aluminum doped zinc oxide (AZO) films, carbon nanotube (CNT)-containing films, Ag nanowire-containing films, or graphene.

BRIEF DESCRIPTION OF THE DRAWINGS

The above and other features and advantages of embodiments of the present invention will become more apparent by reference to the following detailed description when considered together with the accompanying drawing, which is a cross-sectional view of a display member according to one embodiment of the present invention.

DETAILED DESCRIPTION

In the following detailed description, only certain embodiments of the present invention are shown and described, by way of illustration. As those skilled in the art would recognize, the described embodiments may be modified in many different forms and the invention should not be construed as being limited to the embodiments set forth herein. Also, in the context of the present application, when a first element is referred to as being "on" a second element, it can be directly on the second element or be indirectly on the second element with one or more intervening elements interposed therebetween. Like reference numerals designate like elements throughout the specification. As used herein, the term "(meth)acrylate" may refer to acrylates, methacrylates and acrylate-methacrylate copolymers.

As used herein, the term "copolymer" may refer to oligomers, polymers, or resins.

In accordance with one aspect according to an embodiment of the present invention, an adhesive film may have a ratio (B/A) of 90° peel strength (B) at 90° C. to 90° peel strength (A) at 25° C. of about 0.1 or less. If the ratio exceeds about 0.1, the adhesive film can exhibit poor reworkability due to poor attachment or detachment at high temperatures, and can damage modules or panels that include the adhesive film. The ratio (B/A) may be about 0.001 to about 0.1, for example, about 0.09 to about 0.095, for example about 0.09 to about 0.1.

90° peel strength is a value of the strength measured when an adhesive film is peeled at an angle of 90° from a substrate (for example, a glass plate) at a speed of 300 mm/min after attaching the adhesive film (e.g., an adhesive film having a thickness of 150 μm), stacked on, for example, a 50 μm thick PET film, to the substrate. As used herein, the expression "90° peel strength (A)" refers to a peel strength measured at 25° C. as described above, except that the peel strength is measured after aging the adhesive film attached to the substrate at 25° C. for 30 minutes. As used herein, the expression "90° peel strength (B)" refers to peel strength measured as described above, except that the peel strength is measured at 90° C. after aging the adhesive film attached to the substrate at 25° C. for 30 minutes and exposing the adhesive film to a temperature of 90° C. for 40 seconds.

The 90° peel strength (A) may be about 1800 g/in to about 3500 g/in, and the 90° peel strength (B) may be about 50 g/in to about 350 g/in.

The adhesive film may include an alkyl (meth)acrylate having a linear or branched alkyl group having 18 or more carbon atoms (e.g., the adhesive film may include a (meth)acrylate copolymer including the alkyl (meth)acrylate). The alkyl (meth)acrylate has a high crystallinity and thus improves flowability of the adhesive film (even at high temperature) such that the adhesive film can be easily detached from an adherend at high temperature, thereby improving reworkability of the adhesive film. In addition, the alkyl (meth)acrylate has a high molecular weight, thereby improving (or securing) durability of the adhesive film. The alkyl (meth)acrylate may be present in the adhesive film in an amount of about 5 wt % to about 15 wt %, for example, about 5, 6, 7, 8, 9, 10, 11, 12, 13, 14 or 15 wt %, based on the total weight of the adhesive film. Within any of the foregoing ranges, the adhesive film can exhibit sufficient reworkability, and good adhesion and reliability.

The adhesive film may have a rate of change of resistance (ΔR) of about 5.0% or less (about 0% to about 5%), for example, about 2.0% or less (about 0% to about 2%), as represented by Equation 1:

$$\Delta R = \frac{P_2 - P_1}{P_1} \times 100, \qquad \text{Equation 1}$$

In Equation 1, $P_2$ is a resistance of the adhesive film after exposing the adhesive film to a temperature of 60° C. at a relative humidity of 90% (RH) for 240 hours, and $P_1$ is an initial resistance of the adhesive film.

In some embodiments, the adhesive film functions as an adhesive layer attached to one or more sides of an optical film and is used to attach glass plates, substrates, electrodes of touch panels, LCD/organic light emitting diode (OLED) modules and touch panels, optical films, and the like to each other. The optical film may include touch panels, windows, polarizers, color filters, retardation films, elliptic polarizing films, reflective films, antireflective films, compensation films, brightness enhancing films, alignment layers, light diffusion films, anti-scattering films for glass, surface protective films, plastic LCD substrates, indium tin oxide (ITO) films, fluorinated tin oxide (FTO) films, aluminum doped zinc oxide (AZO) films, carbon nanotube (CNT)-containing films, Ag nanowire-containing films, and/or transparent electrode films of graphene. For example, the adhesive film may be used as an optical clear adhesive (OCA) film or a touch panel film.

The adhesive film may include a cured product of an adhesive composition including a (meth)acrylic copolymer, an initiator, and a cross-linking agent. For example, the adhesive composition may be coated onto a release film (for example, a polyester film including polyethylene terephthalate and/or the like), followed by UV curing, thereby preparing the adhesive film. UV curing may be performed at about 10 mW/cm$^2$ to about 200 mW/cm$^2$ for about 5 minutes. UV curing may be performed in the absence of oxygen (e.g., UV curing may be performed in or under an inert atmosphere). The adhesive composition may be coated to a thickness of about 50 μm to about 2 mm, for example, about 50 μm to about 1.5 mm, but the thickness is not limited thereto.

The adhesive film may have a thickness (excluding a thickness of the release film) of about 10 μm to about 2 mm, for example, about 50 μm to about 1.5 mm, but the thickness is not limited thereto.

In accordance with another aspect of an embodiment of the present invention, an adhesive composition may include: (A) a (meth)acrylic copolymer; (B) an initiator; and (C) a cross-linking agent.

(Meth)Acrylic Copolymer

The (meth)acrylic copolymer may be a copolymer formed from a monomer mixture including at least one selected from (a1) an alkyl (meth)acrylate having a $C_1$ to $C_{17}$ alkyl group, (a2) an alkyl (meth)acrylate having an alkyl group having 18 or more carbon atoms, (a3) a (meth)acrylate having an alicyclic group, (a4) a (meth)acrylate having a hydroxyl group, and (a5) a (meth)acrylate having a hetero-alicyclic group. In one embodiment, the (meth)acrylic copolymer may be a copolymer formed from a monomer mixture including the (a1) alkyl (meth)acrylate having a $C_1$ to $C_{17}$ alkyl group, the (a2) alkyl (meth)acrylate having an alkyl group having 18 or more carbon atoms, the (a3) (methacrylate having an alicyclic group, the (a4) (meth)acrylate having a hydroxyl group, and the (a5) (meth)acrylate having a hetero-alicyclic group.

For example, the alkyl (meth)acrylate having a $C_1$ to $C_{17}$ alkyl group may include a (meth)acrylate having a linear or branched, unsubstituted, $C_1$ to $C_{17}$ alkyl group. Examples of the alkyl (meth)acrylate having a $C_1$ to $C_{17}$ alkyl group may include methyl (meth)acrylate, ethyl (meth)acrylate, propyl (meth)acrylate, butyl (meth)acrylate, pentyl (meth)acrylate, hexyl (meth)acrylate, ethylhexyl (meth)acrylate, heptyl (meth)acrylate, octyl (meth)acrylate, nonyl (meth)acrylate, decyl (meth)acrylate, undecyl (meth)acrylate, dodecyl (meth)acrylate, and the like, but the alkyl (meth)acrylate having a $C_1$ to $C_{17}$ alkyl group is not limited thereto. The foregoing examples of the alkyl (meth)acrylate having a $C_1$ to $C_{17}$ alkyl group may be used alone or in combination thereof. For example, the alkyl (meth)acrylate having a $C_1$ to $C_{17}$ alkyl group may be an alkyl (meth)acrylate having a $C_7$ to $C_{10}$ alkyl group.

The alkyl (meth)acrylate having a $C_1$ to $C_{17}$ alkyl group may be present in the monomer mixture or (meth)acrylic copolymer in an amount of about 40 wt % to about 70 wt %, based on the total weight of the monomer mixture or (meth)acrylic copolymer. Within this range, the adhesive film does not exhibit bubbling and detachment under hot and humid conditions, and exhibits good durability. For example, the alkyl (meth)acrylate having a $C_1$ to $C_{17}$ alkyl group may be present in the monomer mixture or (meth)acrylic copolymer in an amount of about 50 wt % to about 60 wt %, for example, about 50 wt % to about 55 wt %, or, for example, about 50, 51, 52, 53, 54, 55, 56, 57, 58, 59 or 60 wt %, based on the total amount of the monomer mixture or (meth)acrylic copolymer.

The alkyl (meth)acrylate having an alkyl group having 18 or more carbon atoms may be a monomer having a melting point of about 10° C. to about 80° C. and high crystallinity. As a result, the alkyl (meth)acrylate having an alkyl group having 18 or more carbon atoms exhibits flowability in the adhesive film at high-temperature (for example, 90° C.), and thus, can reduce the peel strength of the adhesive film at high temperatures (for example, 90° C.). As a result, the alkyl (meth)acrylate allows the adhesive film to easily be detached from an adherend, for example, films, windows, and the like, at high temperature, thereby improving reworkability of the adhesive film.

For example, the alkyl (meth)acrylate having an alkyl group having 18 or more carbon atoms may include a (meth)acrylate having a linear or branched, saturated or unsaturated, unsubstituted, $C_{18}$ to $C_{50}$, for example, $C_{21}$ to $C_{40}$, or $C_{21}$ to $C_{25}$, alkyl group. The alkyl (meth)acrylate having an alkyl group having 18 or more carbon atoms may include at least one selected from stearyl (meth)acrylate, isostearyl (meth)acrylate, nonadecyl (meth)acrylate, arachidyl (meth)acrylate, heneicosyl (meth)acrylate, behenyl (meth)acrylate (e.g., $C_{25}H_{48}O_2$ or $C_{26}H_{50}O_2$), lignoceryl (meth)acrylate, and ceryl (meth)acrylate. The alkyl (meth)acrylate having an alkyl group having 18 or more carbon atoms may be present in the monomer mixture or (meth)acrylic copolymer in an amount of 5 wt % to 40 wt %, for example, 5 wt % to 15 wt %, or, for example about 5, 6, 7, 8, 9, 10, 11, 12, 13, 14, or 15 wt %, based on the total weight of the monomer mixture or (meth)acrylic copolymer. Within any of the foregoing ranges, the alkyl (meth)acrylate having an alkyl group having 18 or more carbon atoms can impart flowability to the adhesive film (even at high temperatures), thereby allowing the adhesive film to be easily attached to or detached from the adherend at high temperature and improving reworkability of the adhesive film.

The (meth)acrylate having an alicyclic group may be a (meth)acrylate having a $C_3$ to $C_{20}$ alicyclic group. Examples of the (meth)acrylate having an alicyclic group include isobornyl (meth)acrylate (IBOA), cyclohexyl (meth)acrylate, cyclopentyl (meth)acrylate, and the like, but the (meth)acrylate having an alicyclic group is not limited thereto. The foregoing examples of the (meth)acrylate having an alicyclic may be used alone or in combination thereof. The (meth)acrylate having an alicyclic group may be present in the monomer mixture or (meth)acrylic copolymer in an amount of about 1 wt % to about 20 wt %, based on the total weight of the monomer mixture or (meth)acrylic copolymer. Within this range, the adhesive film can exhibit improved heat resistance, durability and adhesion. For example, the (meth)acrylate having an alicyclic group may be present in the monomer mixture or (meth)acrylic copolymer in an amount of about 15 wt % to about 20 wt %, for example, about 16 wt % to about 18 wt %, or, for example about 15, 16, 17, 18, 19, or 20 wt %, based on the total weight of the monomer mixture or (meth)acrylic copolymer.

Examples of the (meth)acrylate having a hydroxyl group may include a (meth)acrylate including a $C_1$ to $C_{20}$ alkyl group or $C_5$ to $C_{20}$ cycloalkyl group having a hydroxyl group, such as 2-hydroxyethyl (meth)acrylate, 4-hydroxybutyl (meth)acrylate, 2-hydroxypropyl (meth)acrylate, 2-hydroxybutyl (meth)acrylate, 6-hydroxyhexyl (meth)acrylate, 1,4-cyclohexanedimethanol mono(meth)acrylate, chloro-2-hydroxypropyl (meth)acrylate, diethyleneglycol mono(meth)acrylate, and the like; $C_1$ to $C_{10}$ unsaturated alcohols including allyl alcohols, and the like, but the (meth)acrylate having a hydroxyl group is not limited thereto. The foregoing examples of the (meth)acrylate having a hydroxyl group may be used alone or in combination thereof. The (meth)acrylate having a hydroxyl group may be present in the monomer mixture or (meth)acrylic copolymer in an amount of about 5 wt % to about 30 wt %, based on the total weight of the monomer mixture or (meth)acrylic copolymer. Within this range, the adhesive film can exhibit improved adhesion and good durability, and does not exhibit bubbling under humid conditions. For example, the (meth)acrylate having a hydroxyl group may be present in the monomer mixture or (meth)acrylic copolymer in an amount of about 15 wt % to about 25 wt %, for example, in an amount of about 15 wt % to about 18 wt %, for example, about 15, 16, 17, 18, 19, 20, 21, 22, 23, 24 or 25 wt %, based on the total weight of the monomer mixture or (meth)acrylic copolymer.

The (meth)acrylate having a hetero-alicyclic group may include a (meth)acrylic monomer having a single $C_4$ to $C_6$ hetero-alicyclic ring including a nitrogen, oxygen or sulfur atom. The (meth)acrylate having a hetero-alicyclic group may be present in the monomer mixture or (meth)acrylic copolymer in an amount of about 1 wt % to about 10 wt %, based on the total weight of the monomer mixture or (meth)acrylic copolymer. Within this range, the adhesive film can exhibit improved properties of adhesion, durability and reliability. For example, the (meth)acrylate having a hetero-alicyclic group may be present in the monomer mixture or (meth)acrylic copolymer in an amount of about 1 wt % to about 5 wt %, for example about 1, 1.5, 2.0, 2.5, 3.0, 3.5, 4.0, 4.5 or 5.0 wt %, based on the total weight of the monomer mixture or (meth)acrylic copolymer.

The monomer mixture may further include a monomer having a carboxylic acid group (e.g., the (meth)acrylic copolymer may further include a polymer segment having a carboxylic group). The monomer having a carboxylic acid group may be (meth)acrylic acid, itaconic acid, maleic acid, or fumaric acid, but the monomer having a carboxylic acid group is not limited thereto. The foregoing examples of the monomer having a carboxylic acid group may be used alone or in combination thereof. The monomer having a carboxylic acid group or the polymer segment having a carboxylic acid group may be, optionally, present in the monomer mixture or (meth)acrylic copolymer, respectively, in an amount of about 10 wt % or less (about 0 wt % to about 10 wt %), based on the total weight of the monomer mixture or (meth)acrylic copolymer. Within this range, the adhesive film can exhibit improved adhesion and durability, and can suppress surface corrosion of transparent electrode films. For example, the monomer having a carboxylic acid group or the polymer segment having a carboxylic group may be present in the monomer mixture or (meth)acrylic copolymer, respectively, in an amount of about 0.01 wt % to about 10 wt %, for example, about 0.01 wt % to about 5 wt %, based on the total weight of the monomer mixture or (meth)acrylic copolymer.

The (meth)acrylic copolymer may be prepared by partial polymerization after introducing the initiator into the monomer mixture. Polymerization is performed until the (meth) acrylic copolymer has a viscosity of about 500 cPs to about 20,000 cPs at 25° C. and becomes a viscous liquid. Within this range, the adhesive composition can be easily coated, and provides good workability. Polymerization may be performed by UV irradiation.

The initiator may include a photopolymerization initiator. The photopolymerization initiator is activated by UV irradiation or electron beam treatment and generates a radical reaction by activating a carbon-carbon double bond in the adhesive composition. Examples of the initiator include α-hydroxy ketone compounds, benzylketal compounds, and mixtures thereof, but the initiator is not limited thereto. The α-hydroxy ketone compounds may include 1-hydroxy-cyclohexyl-phenyl-ketone, 2-hydroxy 2-methyl-1-phenyl-1-propanone, 2-hydroxy-1-[4-(2-hydroxyethoxy)phenyl]-2-methyl-1-propanone, and the like, but the α-hydroxy ketone compounds are not limited thereto. The foregoing examples of the initiators may be used alone or in combination thereof. The initiator may be present in the adhesive composition in an amount of about 0.001 parts by weight to about 3 parts by weight, for example, about 0.003 parts by weight to about 1 part by weight, based on 100 parts by weight of the monomer mixture for preparation of the (meth)acrylic copolymer. Within any of the foregoing ranges, the adhesive film can achieve low light leakage and can exhibit good durability and reliability.

The (meth)acrylic copolymer has a glass transition temperature (Tg) of about −50° C. to about −5° C., for example, about −31° C. to about −10° C., or, for example, about −31, −30, −29, −28, −27, −26, −25, −24, −23, −22, −21, −20, −19, −18, −17, −16, −15, −14, −13, −12, −11 or −10° C. Within any of the foregoing ranges, the adhesive film can exhibit good workability, durability, and adhesion.

The (meth)acrylic copolymer may have a viscosity of about 1,000 cPs to about 50,000 cPs at 25° C., for example, about 1,000 cPs to about 15,000 cPs, or about 1,000 cPs to about 5,000 cPs.

The (meth)acrylic copolymer may have a weight average molecular weight of about 150,000 g/mol to about 3,000,000 g/mol, for example, about 2,000,000 g/mol to about 2,800,000 g/mol, or, for example, about 2,000,000, 2,100,000, 2,200,000, 2,300,000, 2,400,000, 2,500,000, 2,600,000, 2,700,000 or 2,800,000 g/mol. Within any of the foregoing ranges, the adhesive film prepared by curing the adhesive composition can exhibit good durability and adhesion, and can exhibit good adhesion even after being left for a long time under high temperature and high humidity conditions.

The (meth)acrylic copolymer may be present in the adhesive composition, in terms of solids content, in an amount of about 60 wt % to about 99.9 wt %, for example, about 90 wt % to about 99.9 wt %, based on the total weight of solids in the adhesive composition. Within any of the foregoing ranges, the adhesive film can exhibit improved initial and long-term adhesion.

Initiator

The initiator may include the photopolymerization initiator. Details of the initiator are as described above.

The initiator may be present in an amount of about 0.001 parts by weight to about 3 parts by weight, for example, about 0.003 parts by weight to about 1 part by weight, for example, about 0.1 parts by weight to about 0.5 parts by weight, based on 100 parts by weight of the monomer mixture or (meth)acrylic copolymer. Within any of the foregoing ranges, the curing reaction can be substantially (or completely) performed, and deterioration of transmittance due to residual initiator can be prevented (or an amount or likelihood of such deterioration can be reduced).

The initiator may be present in the adhesive composition, in terms of solids content, in an amount of about 0.001 wt % to about 30 wt %, for example, about 0.001 wt % to about 1.5 wt %, based on the total weight of solids in the adhesive composition. Within any of the foregoing ranges, the adhesive composition can have a good conversion ratio.

Cross-Linking Agent

The cross-linking agent may include a polyfunctional (meth)acrylate curable by active energy beams.

Examples of the polyfunctional(meth)acrylate may include: bi-functional(meth)acrylates, such as 1,4-butanediol di(meth)acrylate, 1,6-hexanediol di(meth)acrylate, 1,12-dodecanediol di(meth)acrylate, neopentylglycol di(meth)acrylate, polyethylene glycol di(meth)acrylate, neopentylglycol adipate di(meth)acrylate, dicyclopentanyl di(meth)acrylate, caprolactone-modified dicyclopentenyl di(meth)acrylate, ethylene oxide-modified di(meth)acrylate, bis(meth)acryloxyethyl hydroxyl isocyanurate, allylated cyclohexyl di(meth)acrylate, tricyclodecanedimethanol di(meth)acrylate, dimethyloldicyclopentane di(meth)acrylate, ethylene oxide-modified hexahydrophthalic acid di(meth)acrylate, neopentylglycol-modified trimethylpropane di(meth)acrylate, adamantane di(meth)acrylate, 9,9-bis[4-(2-acryloyloxyethoxy)phenyl]fluorene, and the like; tri-functional(meth)acrylates, such as trimethylolpropane tri(meth)acrylate, dipentaerythritol tri(meth)acrylate, propionate-modified dipentaerythritol tri(meth)acrylate, pentaerythritol tri(meth)acrylate, propylene oxide-modified trimethylolpropane tri(meth)acrylate, tri-functional urethane (meth)acrylate, tris(2-(meth)acryloxyethyl)isocyanurate, and the like; tetra-functional(meth)acrylates, such as diglycerol tetra(meth)acrylate, pentaerythritol tetra(meth)acrylate and the like; penta-functional(meth)acrylates, such as dipentaerythritol penta(meth)acrylate, and the like; and hexa-functional(meth)acrylates, such as dipentaerythritol hexa(meth)acrylate, caprolactone-modified dipentaerythritol hexa(meth)acrylate, hexa-functional urethane(meth)acrylate (e.g., reaction products of isocyanate monomers and trimethylolpropane tri(meth)acrylate), and the like, but the cross-linking agent is not limited thereto. The foregoing examples of the cross-linking agent may be used alone or in combination thereof. The cross-linking agent may be a polyfunctional(meth)acrylate of a multivalent alcohol having about 2 to about 20 hydroxyl groups.

In addition, the cross-linking agent may include typical isocyanate, epoxy, aziridine, melamine, amine, imide, carbodiimide, and amide crosslinking agents, and mixtures thereof.

The cross-linking agent may be present in the adhesive composition in an amount of about 0.01 parts by weight to about 5 parts by weight, for example, about 0.03 parts by weight to about 3 parts by weight, for example, about 0.05 parts by weight to about 2 parts by weight, for example, about 0.1 parts by weight to about 0.3 parts by weight, or, for example, about 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95 or 1.0 parts by weight based on 100 parts by weight of the monomer mixture or (meth)acrylic copolymer.

The cross-linking agent may be present in the adhesive composition in an amount of about 0.0001 wt % to about 30 wt %, for example, about 0.0001 wt % to about 1 wt %, based on the total weight of solids in the adhesive composition. Within any of the foregoing ranges, the adhesive film can exhibit improved reliability.

The adhesive composition may optionally further include any suitable additives commonly used in the art, such as silane coupling agents (e.g., silane compounds), curing accelerators, ionic liquids, lithium salts, inorganic fillers, softening agents, antioxidants, anti-aging agents, stabilizers, adhesion-imparting resins, modified resins (e.g., polyol, phenol, acrylic, polyester, polyolefin, epoxy, epoxidized polybutadiene resins, and the like), leveling agents, anti-foaming agents, plasticizers, dyes, pigments (coloring pigments, extender pigments, and the like), treatment agents, UV protective agents, fluorescence brightening agents, dispersants, heat stabilizers, light stabilizers, UV absorbents, antistatic agents, lubricants, solvents, and the like, but the additives are not limited thereto. As the silane coupling agents, the adhesive composition may further include siloxane and epoxy silane coupling agents, but the silane coupling agents are not limited thereto.

The additive (for example, a silane coupling agent) may be present in the adhesive composition in an amount of about 0.01 parts by weight to about 5 parts by weight, for example, about 0.03 parts by weight to about 3 parts by weight, for example, about 0.05 parts by weight to about 2 parts by weight, for example, about 0.05 parts by weight to about 0.2 parts by weight, based on 100 parts by weight of the monomer mixture or (meth)acrylic copolymer.

The additive (for example, a silane coupling agent) may be present in the adhesive composition in an amount of about 0.0001 wt % to about 30 wt %, for example, about 0.0001 wt % to about 1 wt %, based on the total weight of solids in the adhesive composition. Within any of the foregoing ranges, the adhesive film can exhibit improved reliability.

The adhesive composition may have a viscosity of about 1,000 cPs to about 50,000 cPs at 25° C.

The adhesive composition may be used for attachment of optical films, including polarizing films and transparent electrode films.

In accordance with a further aspect according to embodiments of the present invention, a method for preparing the adhesive film includes: preparing a (meth)acrylic copolymer (e.g., a (meth)acrylic oligomer) by polymerization of a monomer mixture including at least one selected from an alkyl (meth)acrylate having a C1 to C17 alkyl group, an alkyl (meth)acrylate having an alkyl group having 18 or more carbon atoms, a (meth)acrylate having an alicyclic group, a (meth)acrylate having a hydroxyl group, a monomer having a carboxylic acid group, and a (meth)acrylate having a hetero-alicyclic group; preparing an adhesive composition by mixing the (meth)acrylic copolymer (e.g., the (meth)acrylic oligomer) with an initiator and a cross-linking agent; and UV-curing the adhesive composition.

The adhesive composition may further include a non-curable compound. The (meth)acrylic copolymer (e.g., the (meth)acrylic oligomer) is substantially free from solvents, and may have a viscosity from about 1,000 cPs to about 50,000 cPs at 25° C. As used herein, the term "substantially" is used as a term of approximation, and not as a term of degree. In particular, as used herein, "substantially free from solvents" refers to the absence of most of the solvent, but that some trace amount of solvent may be present. In some embodiments, the (meth)acrylic copolymer (e.g., the (meth)acrylic oligomer) is completely free of solvents.

Yet another aspect according to embodiments of the present invention relates to a display member. The display member includes an optical film, and the adhesive film is formed on one or more sides of the optical film.

The accompanying drawing is a cross-sectional view of a display member according to one embodiment of the present invention. Referring to the accompanying drawing, the display member may include: an optical film 40; and an adhesive film 200 formed on one or more sides of the optical film 40.

Examples of the optical film include touch panels, windows, polarizers, color filters, retardation films, elliptic polarizing films, reflective films, antireflective films, compensation films, brightness enhancing films, alignment layers, light diffusion films, anti-scattering films for glass, surface protective films, plastic LCD substrates, indium tin oxide (ITO) films, fluorinated tin oxide (FTO) films, aluminum doped zinc oxide (AZO) films, carbon nanotube (CNT)-containing films, Ag nanowire-containing films, transparent electrode films of graphene, and the like, but the optical film is not limited thereto. The display member may be easily prepared by those of ordinary skill in the art. For example, a touch panel may be prepared by attaching a touchpad to a window or an optical film using the adhesive film. Alternatively, the adhesive film may be applied to a polarizing film using any suitable method commonly used in the art.

Next, embodiments of the present invention will be explained with reference to some examples. However, it should be understood that these examples are provided for illustration only and are not to be in any way construed as limiting the present invention.

The components used in the Examples and Comparative Examples are as follows.

(A) (Meth)acrylic copolymer: behenyl acrylate (ABH), 2-ethylhexyl acrylate (EHA), isobornyl acrylate (IBOA), acryloyl morpholin (ACMO), and 2-hydroxyethyl acrylate (B) Initiator: 2,2-dimethoxy-2-phenylacetophenone (Irgacure™ 651, available from Ciba Japan K.K.)

(C) Cross-linking agent: 1,6-hexanediol diacrylate (HDDA)

(D) Silane coupling agent: siloxane epoxy silane (X-41-1059A, available from Shin-Etsu Co., Ltd.)

Examples 1 to 2 and Comparative Examples 1 to 3

The amount of the (A) (meth)acrylic copolymer as listed in Table 1 (unit: parts by weight) and 0.04 parts by weight of the (B) initiator were mixed in a glass container, followed by replacing dissolved oxygen with nitrogen gas. Then, the mixture was partially polymerized by UV irradiation for several minutes using a low pressure lamp, thereby preparing a viscous liquid having a viscosity of 1,500 cPs at 25° C. Then, 0.31 parts by weight of the (B) initiator and the amounts of the (C) cross-linking agent and the (D) silane coupling agent as listed in Table 1 were added to the viscous liquid, followed by mixing, thereby preparing an adhesive composition.

The prepared adhesive composition was coated onto a 50 μm thick polyethylene terephthalate film (PET, a release film), which is a polyester film, to form a coated composition layer having a thickness of 100 μm. The coated composition layer was then covered with another release film. With the coated composition layer covered with the release films to remove oxygen (or to reduce the amount of oxygen that reaches the coated composition layer), which adversely affects polymerization, the coated composition layer was subjected to UV irradiation from two sides for about 3 minutes using a low pressure lamp, thereby preparing a transparent adhesive sheet including an adhesive film.

The adhesive film was evaluated as to the properties described below, and the results are shown in Table 1.

(1) 90° Peel strength at 25° C.: Using a 50 μm thick PET film (a backing film), the prepared adhesive film (thickness: 150 μm) was attached to a glass substrate, followed by aging at 25° C. for 30 minutes. Then, peel strength was measured using a TA.XT_Plus Texture Analyzer (available from Stable Micro Systems Co., Ltd.) while peeling the film at an angle of 90° at 25° C. and a speed of 300 mm/min.

(2) 90° Peel strength at 90° C.: Using a 50 μm thick PET film (backing film), the prepared adhesive film (thickness: 150 μm) was attached to a glass substrate, subjected to aging at 25° C. for 30 minutes, and exposed to a temperature of 90° C. for 40 seconds. Then, peel strength was measured using a TA.XT_Plus Texture Analyzer (available from Stable Micro System Co., Ltd.) while peeling the film at an angle of 90° at 90° C. and a speed of 300 mm/min.

(3) Peel strength ratio: The ratio of the measured peel strength at 90° C. to the measured peel strength at 25° C. was calculated.

(4) Durability: After the adhesive film was stacked on an ITO film, a glass or polycarbonate film was stacked on the adhesive film, thereby preparing a specimen. After treatment in an autoclave, the specimen was exposed to a temperature of 60° C. at 90% RH for 500 hours. Observation of detachment, peeling and bubbling was performed for the adhesive film and the glass or polycarbonate film using the naked eye, and the adhesive film was rated as follows:

Evaluation Criteria

○: Good (neither bubbling nor peeling)

Δ: Not poor (slight bubbling or peeling)

X: Poor (substantial bubbling or peeling)

(5) Rate of change of resistance (ΔR): After attaching the adhesive film to a substrate including an ITO layer and a PET layer, electrodes were formed on two sides thereof using silver pastes, thereby preparing a sample. Then, after initial resistance ($P_1$, unit: Ω) of the prepared sample was measured, the sample was exposed to a temperature of 60° C. at 90% RH for 240 hours and resistance ($P_2$, unit: Ω) thereof was measured again. The measurement of resistance was performed using a Checkman portable multimeter (available from Tae Kwang electronics Co., Ltd.). Then, each of the measured resistances was substituted into Equation 1, and the rate of change of resistance (ΔR, %) was calculated.

$$\Delta R = \frac{P_2 - P_1}{P_1} \times 100, \quad \text{Equation 1}$$

In Equation 1, $P_2$ is the resistance after exposing the adhesive film to a temperature of 60° C. at 90% RH for 240 hours, and $P_1$ is the initial resistance of the adhesive film.

TABLE 1

|     |      | Example 1 | Example 2 | Comparative Example 1 | Comparative Example 2 | Comparative Example 3 |
|-----|------|-----------|-----------|-----------------------|-----------------------|-----------------------|
| (A) | ABH  | 7         | 10        | 16                    | 4                     | 0                     |
|     | EHA  | 55        | 52        | 49                    | 56                    | 56                    |
|     | IBOA | 18        | 18        | 15                    | 19                    | 20                    |
|     | ACMO | 2         | 2         | 2                     | 2                     | 4                     |
|     | HEA  | 18        | 18        | 18                    | 19                    | 20                    |

TABLE 1-continued

|  | Example 1 | Example 2 | Comparative Example 1 | Comparative Example 2 | Comparative Example 3 |
|---|---|---|---|---|---|
| (B) | 0.35 | 0.35 | 0.35 | 0.35 | 0.35 |
| (C) | 0.2 | 0.2 | 0.2 | 0.2 | 0.2 |
| (D) | 0.1 | 0.1 | 0.1 | 0.1 | 0.1 |
| Preparation method | UV curing | UV curing | UV curing | UV curing | UV curing |
| Peel strength (A) at 25° C. (g/in) | 2200 | 1900 | 1700 | 2300 | 2500 |
| Peel strength (B) at 90° C. (g/in) | 210 | 180 | 150 | 350 | 450 |
| Peel strength ratio (b/a) | 0.095 | 0.094 | 0.088 | 0.152 | 0.18 |
| Durability | ○ | ○ | X | ○ | ○ |
| Rate of change of resistance (%) | 1.2% | 1.2% | 1.3% | 1.3% | 1.2% |

As shown in Table 1, since the adhesive films according to embodiments of the invention had a peel strength ratio of 0.1 or less, that is, had a low 90° peel strength at high temperature while exhibiting a high 90° peel strength at room temperature, the adhesive films could be attached or detached to an adherend even at high temperature, and thus exhibited good reworkability. As a result, the adhesive film allows reuse of TSP, LCD or OLED modules.

While certain embodiments of the present invention have been illustrated and described herein, it will be understood by those of ordinary skill in the art that various modifications, changes, alterations, and equivalent embodiments can be made to the disclosed embodiments without departing from the spirit and scope of the invention as defined by the following claims, and equivalents thereof. Throughout the text and claims, use of the word "about" reflects the penumbra of variation associated with measurement, significant figures, and interchangeability, all as understood by a person having ordinary skill in the art to which this disclosure pertains. Additionally, throughout this disclosure and the accompanying claims, it is understood that even those ranges that may not use the term "about" to describe the high and low values are also implicitly modified by that term, unless otherwise specified.

What is claimed is:

1. An adhesive film comprising:
    a cured product of an adhesive composition, the adhesive composition comprising:
    (A) a (meth)acrylic copolymer formed from a monomer mixture comprising:
        (a1) an alkyl (meth)acrylate having a $C_1$ to $C_{17}$ alkyl group;
        (a2) an alkyl (meth)acrylate having an alkyl group having 18 or more carbon atoms;
        (a3) a (meth)acrylate having an alicyclic group;
        (a4) a (meth)acrylate having a hydroxyl group; and
        (a5) a (meth)acrylate having a hetero-alicyclic group,
        wherein the (a2) alkyl (meth)acrylate having an alkyl group having 18 or more carbon atoms is present in the monomer mixture in an amount of about 5 wt % to 15 wt %, and the (a4) (meth)acrylate having a hydroxyl group is present in the monomer mixture in an amount of about 15 wt % to about 25 wt %, based on the total amount of the monomer mixture,
    the adhesive film having a ratio (X/Y) of 90° peel strength after aging the adhesive film at 25° C. for 30 minutes and exposing the adhesive film to a temperature of 90° C. for 40 seconds (X) to 90° peel strength after aging the adhesive film at 25° C. for 30 minutes (Y) of about 0.09 to about 0.1.

2. The adhesive film according to claim 1, wherein the peel strength (Y) is about 1800 g/in to about 3500 g/in, and the peel strength (X) is about 50 g/in to about 350 g/in.

3. The adhesive film according to claim 1, wherein the (a2) alkyl (meth)acrylate having an alkyl group having 18 or more carbon atoms comprises a (meth)acrylate having a $C_{21}$ to $C_{25}$ alkyl group.

4. The adhesive film according to claim 1, wherein the (a1) alkyl (meth)acrylate having a $C_1$ to $C_{17}$ alkyl group is ethylhexyl (meth)acrylate, and the (a2) alkyl (meth)acrylate having an alkyl group having 18 or more carbon atoms is behenyl (meth)acrylate.

5. The adhesive film according to claim 1, wherein the adhesive composition further comprises at least one of an initiator or a cross-linking agent.

6. The adhesive film according to claim 1, wherein the adhesive composition further comprises a silane coupling agent.

7. The adhesive film according to claim 1, wherein the adhesive film has a rate of change of resistance (ΔR) of about 2.0% or less, as represented by Equation 1:

$$\Delta R = \frac{P_2 - P_1}{P_1} \times 100,$$ Equation 1 wherein $P_2$ is a resistance of the adhesive film after exposing the adhesive film to a temperature of 60° C. at a relative humidity of 90% for 240 hours, and $P_1$ is an initial resistance of the adhesive film.

8. The adhesive film according to claim 1, wherein the adhesive film has a thickness of about 10 μm to about 2 mm.

9. The adhesive film according to claim 1, wherein
    the adhesive composition further comprises:
        (B) an initiator; and
        (C) a cross-linking agent.

10. The adhesive film according to claim 9, wherein the (a2) alkyl (meth)acrylate having an alkyl group having 18 or more carbon atoms comprises a (meth)acrylate having a $C_{21}$ to $C_{25}$ alkyl group.

11. The adhesive film according to claim 9, wherein the (meth)acrylic copolymer comprises:
    about 50 wt % to about 55 wt % of the (a1) alkyl (meth)acrylate having a $C_1$ to $C_{17}$ alkyl group, based on the total weight of the (meth)acrylic copolymer;

about 16 wt % to about 18 wt % of the (a3) (meth)acrylate having an alicyclic group, based on the total weight of the (meth)acrylic copolymer;

about 15 wt % to about 18 wt % of the (a4) (meth)acrylate having a hydroxyl group, based on the total weight of the (meth)acrylic copolymer; and about 1 wt % to about 5 wt % of the (a5) (meth)acrylate having a hetero-alicyclic group, based on the total weight of the (meth)acrylic copolymer.

12. The adhesive film according to claim 9, comprising:
100 parts by weight of the (A) (meth)acrylic copolymer;
about 0.001 parts by weight to about 3 parts by weight of the (B) initiator; and
about 0.01 parts by weight to about 5 parts by weight of the (C) cross-linking agent.

13. The adhesive film according to claim 9, further comprising: an epoxy silane coupling agent.

14. A display member comprising:
an optical film; and
the adhesive film according to claim 1 on one or more sides of the optical film.

15. The display member according to claim 14, wherein the optical film is selected from the group consisting of touch panels, windows, polarizers, color filters, retardation films, elliptical polarizing films, reflective films, antireflective films, compensation films, brightness enhancing films, alignment layers, light diffusion films, anti-scattering films for glass, surface protective films, plastic LCD substrates, indium tin oxide (ITO) films, fluorinated tin oxide (FTO) films, aluminum doped zinc oxide (AZO) films, carbon nanotube (CNT)-containing films, Ag nanowire-containing films, and graphene.

* * * * *